June 17, 1969  V. ZUMSTEG  3,450,915
BRUSH ARRANGEMENT FOR DIRECT CURRENT DYNAMOELECTRIC MACHINE
Filed April 25, 1966

INVENTOR.
Viktor Zumsteg
BY
Pierce, Scheffler & Parker
Attorneys ary # United States Patent Office 3,450,915
Patented June 17, 1969

3,450,915
BRUSH ARRANGEMENT FOR DIRECT CURRENT DYNAMOELECTRIC MACHINE
Viktor Zumsteg, Birr, Aargau, Switzerland, assignor to Aktiengesellschaft Brown, Boveri & Cie, Baden, Switzerland, a joint-stock company
Filed Apr. 25, 1966, Ser. No. 544,878
Claims priority, application Switzerland, May 10, 1965, 6,485/65
Int. Cl. H02k 5/14; H01r 39/38
U.S. Cl. 310—239          6 Claims

ABSTRACT OF THE DISCLOSURE

A dynamoelectric machine structure features a brush assembly which can be removed without disassembly of the machine. To this end the end plate of the machine housing is provided with an opening through which the brush holder and brushes are removed, the brush holder being secured to a ring which is removably attached to the end plate. As the ring is removed, a spring loaded pin comes into action automatically so as to apply an end pressure against the brushes in the brush holder to keep the brushes from falling out.

---

The present invention relates to brush assemblies for direct current electrical machines such as motors and generators and is more particularly directed to an improved brush bridge assembly for use on motors which are not easily accessible and wherein replacement of the brushes whenever necessary is greatly facilitated.

With electric motors of the trunnion bearing type, the brush bridges, i.e. rockers, inside of the motor are secured in place either by fastening them to the end plate of the motor which mounts the bearings, or to the motor housing. The bearing plate, or the motor housing, as the case may be, is provided with openings which provide access to permit the brushes to be exchanged. The brush bridge can be removed only after the bearing plate has been taken off the motor.

If the installation of the motor is such that the brushes are not readily accessible through these openings, as is the case, for example, when the motor is located to the inside of a wheel hub, either the motor must be taken out, or at least the bearing plate on the commutator side must be removed. This involves complicated and time consuming work, which it would obviously be desirable to avoid.

The present invention makes this possible, and the principal object is therefore to provide an improved brush bridge assembly for electrical machines of the type referred to which avoids the necessity for any dis-assembly of the machine, or removal of the bearing plate for an exchange of brushes, and which assures optimum accessibility, especially in the case of small sized machines. In addition, by means of the invention, no screws or connections inside of the machine need to be loosened when removing the brush bridge for an exchange of brushes.

In accordance with the invention, this objective is attained by an arrangement in which the brush bridge in the form of a ring is centered on and secured to the outer face of the bearing plate, the brush holders extend into the machine in a finger-like manner through openings in the bearing plate, and that an arresting device, operated from outside of the motor, is provided on the brush bridge which, upon removal of the latter for an exchange of brushes, clamps the brushes in the holder, and similarly releases the brushes in the holder after the brush bridge with new brushes has been re-installed.

Figure 1:
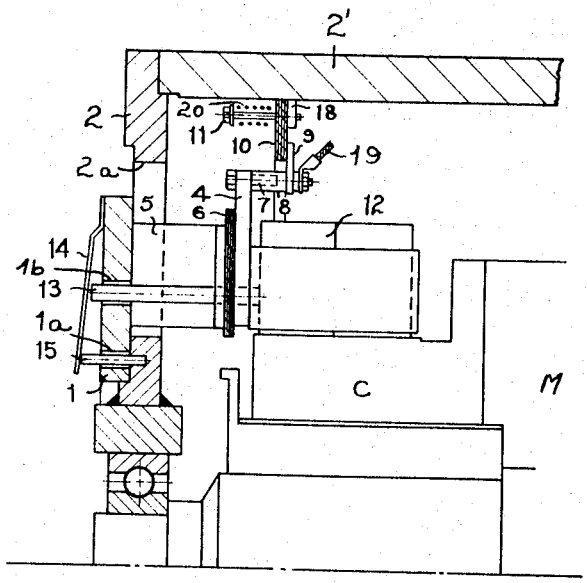
Figure 2:
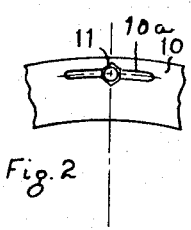
Figure 3:
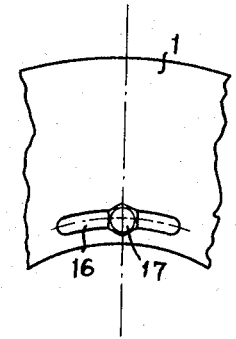
Figure 4:
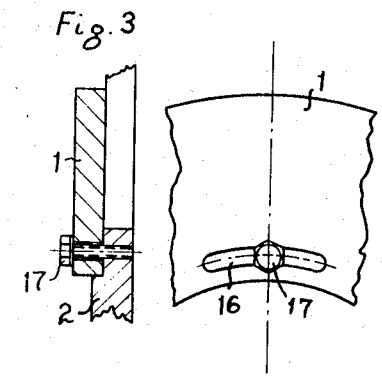

The foregoing as well as other objects and advantages inherent in the invention will become more apparent from the following description of a preferred embodiment thereof and from the accompanying drawings wherein:

FIG. 1 is a longitudinal view of the commutator end of the direct current machine partly in elevation and partly in section which shows the improved brush bridge assembly and FIGS. 2–4 are detailed views which have been included to show more clearly certain structural details of the assembly.

With reference now to the drawings, the direct current machine depicted is indicated in general by M and its commutator by C. The end plate 2 which carries the bearing B for the rotor shaft of the motor is secured to the cylindrical housing part 2'. The brush bridge in the form of a ring 1 is located at the exterior side of end plate 2, is centered thereon in a manner co-axially with the motor shaft and secured in place by means of screw bolts 17 which thread into the end plate 2. To permit rotational adjustment of the brush bridge about the rotor axis, it will be seen from FIGS. 3 and 4 that the bolts 17 pass through arcuate slots 16 in ring 1, the width of the slots being substantially the same as the diameter of shank portions of the bolts so as to maintain the brush bridge ring properly centered in any position of adjustment.

For holding the brushes, an arm 5 extends from the inner face of ring 1 through an opening 2a in end plate 2 and secured to the inner end of this arm with an intermediately positioned insulating member 6 is the brush holder 4 which carries brushes 12. The brush holder 4, which is removable for brush replacement, is electrically connected to the internal wiring 19 of the motor by means of a plug-in type of connection, there being provided for this purpose a plug 7 mounted on removable brush holder 4 and which is entered into a sleeve 8 to which flexible wiring 19 is connected. Sleeve 8 is carried by a lug 9 extending radially inward from a ring 10 of insulating material to which it is secured. Insulating ring 10 is, in turn, secured to circumferentially spaced lugs 18 extending radially inward from the inner side of motor housing 2' by means of circumferentially spaced spring-loaded bolt and slot connections, one of which is shown more clearly in FIG. 2. The bolt 11 extends through a slot 10a in the insulating ring and is screwed into lug 18 until the loading imposed upon the bolt by spring 20 will just barely permit rotational displacement of insulating ring 10 to take place whenever brush ring 1 is rotationally adjusted to change the adjustment of the brushes on the commutator.

Secured to the outre face of the brush bridge ring 1 is a leaf spring 14, the free end of which presses against the end of a fixed pin 15 which projects from end plate 2 to which it is secured through a bore 1a in the ring. Another pin 13 of insulating material, is provided and one end of this pin projects through another bore 1b in ring 1 for cooperation with leaf spring 14 under certain conditions. The oposite end of pin 13 is adapted to be pressed by spring 14 against brushes 12 to arrest the latter but also only under certain conditions. With the brushes in the operative position depicted in FIG. 1, the free end of leaf spring 14 is pressed by pin 15 in such direction as to leave a slight gap between an intermediate part of the spring and the corresponding end of pin 13. Consequently, no endwise pressure can be exerted on pin 13 such as would cause it to press against and arrest the brushes 12. However, when the brush ring 1 is removed by removing bolts 17, this permits the intermediate part of spring 14 to apply a holding pressure to the brushes 12 through the intermediary of the push pin 13 and thus arrest the brushes in their holder so that the brush assembly can be safely removed without the danger of having the brushes fall out. Also, when the brush ring 1 is removed for brush replacement, no manual disconnection of electrical terminals internally of the motor is necessary due to the plug-in type of connection established by plug 7 and its sleeve 8.

In conclusion, it will now be evident that the improved brush bridge assembly facilitates replacement of brushes in an extremely simple manner. The entire brush assembly can be pulled out of the motor simply by removal of externally accessible fastening bolts which secure the brush ring 1 to the motor end plate 2, and this is particularly advantageous when the motors are used to drive a vehicle and are installed at the inner sides of the rims of vehicle wheels and are therefore not easily accessible.

I claim:

1. In a brush assembly for a rotary direct current machine such as a motor wherein the commutator end of the rotor element of the motor is supported in a bearing carried by an end plate of the motor housing, the combination comprising a brush bridge in the form of a ring, means accessible from the outside of said end plate for removably attaching said brush bridge ring in place to the exterior face of said end plate, said brush bridge ring securing means providing for a rotational adjustment of said ring about the rotor axis, a support arm extending from the interior face of said brush bridge ring through an opening provided in said end plate, an electrically conductive brush holder secured to but electrically insulated from said support arm, brushes in said brush holder and which engage the commutator on said rotor, means actuated automatically upon detachment of said brush bridge ring from said end plate for applying an arresting force to said brushes for retaining said brushes in place in the brush holder upon removal of the latter together with said brush bridge ring when detached, means for automatically relieving said brush arresting force upon re-attachment of said brush bridge ring to said end plate, and detachable two-part electrical connector means carried respectively by said brush holder and a support within said motor housing for automatically establishing electrical connection and disconnection respectively as between said brush holder and internal wiring of said motor upon attachment and detachment respectively of said brush bridge ring on said end plate.

2. A brush bridge assembly as defined in claim 1 wherein said means for applying said arresting force to said brushes upon detachment of said brush bridge ring is constituted by a pin slidably mounted within said brush bridge ring and brush holder support arm, one end of said pin being adapted to apply an arresting force against said brushes, and the opposite end of said pin being subjected to pressure from spring means and which is applied only upon detachment of said brush bridge ring.

3. A brush bridge assembly as defined in claim 2 wherein said spring means is constituted by a leaf spring secured to the exterior face of said brush bridge ring and which is held disengaged from the end of said pin by said brush arresting force relieving means when said brush bridge ringe is attached to said end plate.

4. A brush bridge assembly as defined in claim 3 wherein said brush arresting force relieving means is constituted by a pin protruding from said end plate and which passes through a bore in said brush bridge ring to engage the end of said leaf spring.

5. A brush bridge assembly as defined in claim 1 wherein said detachable two-part electrical connector means is constituted by plug and sleeve members, one of said members being secured to said brush holder and the other member being secured to said support within said motor housing.

6. A brush bridge assembly as defined in claim 5 wherein said support within said motor housing to which the appertaining part of said electrical connector is secured is constituted by a ring of insulating material and which is mounted for rotational adjustment to follow any rotational adjustment made in said brush bridge ring.

References Cited

UNITED STATES PATENTS

| 2,070,718 | 2/1937 | Ehrlich | 310—239 |
| 2,324,299 | 7/1943 | Haifley | 310—239 |
| 3,267,312 | 8/1966 | Redick | 310—239 |
| 3,242,362 | 3/1966 | Ciliax | 310—239 |

ORIS L. RADER, *Primary Examiner.*

G. NUNEZ, *Assistant Examiner.*